UNITED STATES PATENT OFFICE.

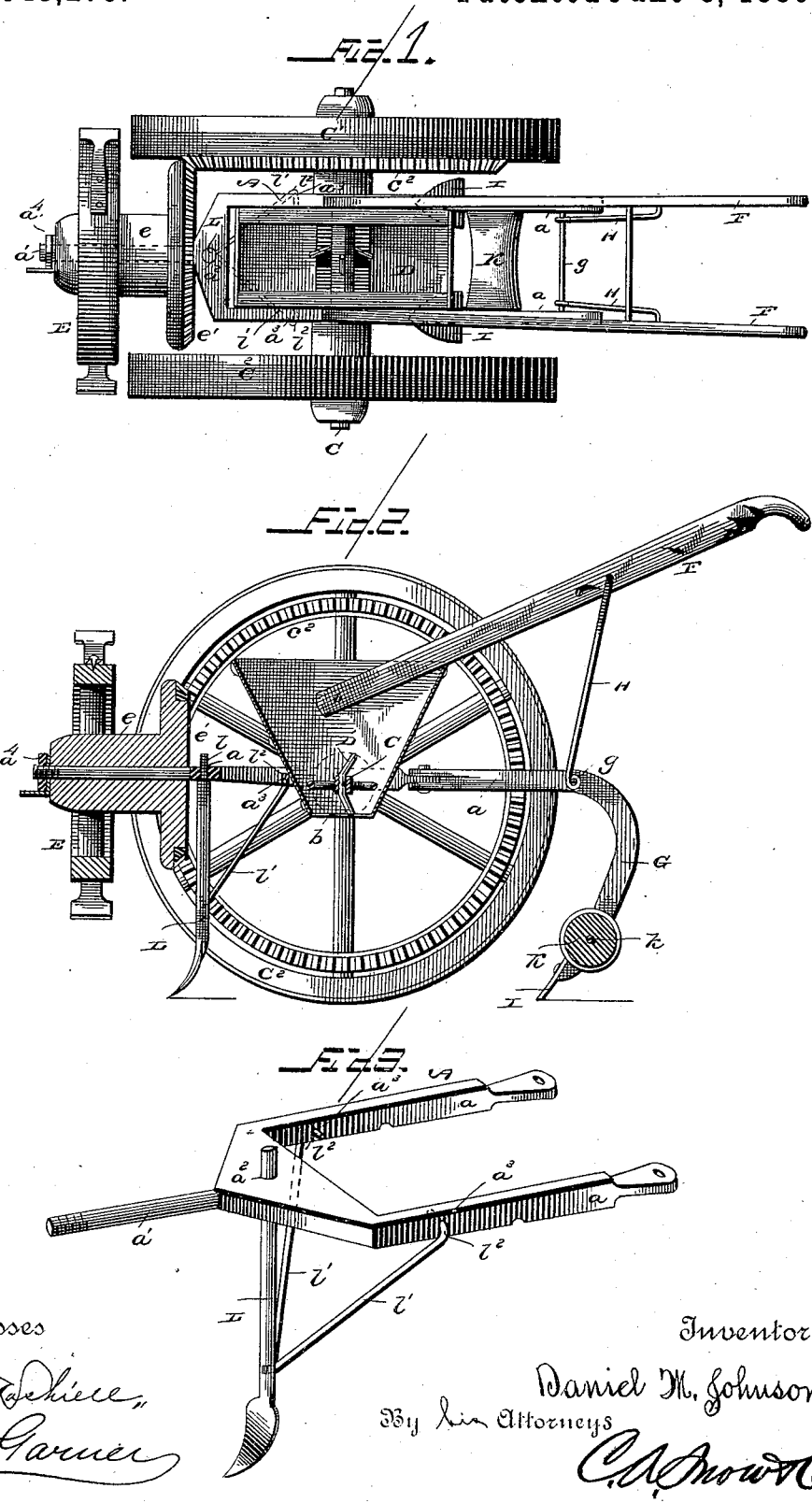

DANIEL MURPHY JOHNSON, OF MORVEN, NORTH CAROLINA.

CULTIVATOR, DISTRIBUTER, AND PLANTER.

SPECIFICATION forming part of Letters Patent No. 343,275, dated June 8, 1886.

Application filed December 2, 1885. Serial No. 184,499. (No model.)

*To all whom it may concern:*

Be it known that I, DANIEL MURPHY JOHNSON, a citizen of the United States, residing at Morven, in the county of Anson and State of North Carolina, have invented a new and useful Improvement in Cultivators, Fertilizer-Distributers, Planters, and Cotton-Choppers, of which the following is a specification, reference being had to the accompanying drawings.

This invention is a combined cultivator, fertilizer-distributer, and cotton planter and chopper; and it consists in the peculiar construction and combination of devices, that will be more fully set forth hereinafter, and particularly pointed out in the claims.

In the drawings, Figure 1 is a top plan view of my invention. Fig. 2 is a vertical longitudinal sectional view of the same. Fig. 3 is a detail perspective view of a portion of the frame, showing the furrow-opener attached thereto.

A represents the frame, which is formed of a single piece of metal, and has the parallel rearwardly-extending side arms, $a$, and the forwardly-extending spindle $a'$, the outer end of which is screw-threaded.

D represents a hopper, which is secured between the side arms of the frame. The front and rear sides of the hopper converge toward the bottom thereof, and in the lower side of the hopper is made a slotted opening, $b$.

C represents a rotating shaft, which extends through the hopper near the bottom thereof, the said shaft being journaled in the sides of the hopper, and to the ends of this shaft are rigidly attached the driving-wheels $C'$ $C^2$. The wheel $C'$ is provided on its inner side with miter-gear teeth $c^2$. From the center of the shaft project radial stirring arms $D'$, which rotate with the shaft and force the cotton-seed or fertilizer contained in the hopper through the opening in the bottom thereof, from whence they fall to the ground.

On the spindle $a'$ is journaled a chopping-wheel, E, which has a rearwardly-extending hub, $e$, to which is secured a miter-gear pinion, $e'$, that meshes with the miter-gear teeth $c^2$.

Attached to the sides of the hopper are the usual handle-levers, F, which are similar in construction to plow-handles, and attached to the rear ends of the side arms of the frame A are the combined plow beams and standards G, which are arranged parallel with each other and connected together by a cross-bar, $g$. Rods H connect the cross-bar $g$ with the handle-levers. To the lower ends of the standards G are attached shovel-plows I, and connecting the lower ends of the said standards is a rod, $k$, on which is journaled a roller, K. This roller has its bearing-face slightly concave, as shown.

A vertical opening, $a^2$, is made in the front side of the frame A, at the center thereof, and in the side arms of the said frame, at a suitable distance from the front end thereof, are made transverse openings $a^3$.

L represents a furrow-opener, which is provided with a vertical standard having its upper end reduced, as at $l$. This reduced portion of the standard passes through the opening $a^2$ in the frame, and attached to the lower end of the standard are rearwardly and upwardly extending diverging spring-rods $l'$, the ends of which are bent inwardly in line with each other, as at $l^2$, and adapted to hook into the openings $a^3$, and thereby secure the furrow-opener to the frame A.

It will be readily understood from the foregoing description that when the machine is in operation the furrow-opener will open a trench to receive the seeds or fertilizer, and that the shovel-plows will throw the dirt from opposite sides into the said trench and convert it into a ridge. The roller between the shovel-plows will roll the upper side of the ridge, and thus complete the operation of planting and rolling the seeds or fertilizer.

A nut, $a^4$, is screwed onto the end of the spindle $a'$, to prevent the chopping-wheel from coming off. After the plants are started they may be readily thinned by drawing my improved machine along the ridges, the chopping-wheel operating to thin out the plants in the usual well-known way.

During the operation of planting the chopping-wheel will preferably be removed.

Having thus described my invention, I claim—

1. The combination, in a planter, of the frame A, the furrow-opener having the standard secured to the frame, and the resilient brace-rods extending rearwardly from the standard and attached to the frame, substantially as described.

2. The combination of the frame A, having the forwardly-projecting spindle and the rearwardly-projecting side arms, the hopper secured between the side arms, the driving-shaft journaled in the hopper, and having the stirring-arms to rotate therein, the driving-wheels on the shaft, one of said wheels having the teeth $c^2$, and the chopping-wheel journaled on the projecting spindle, and having the pinion meshing with the teeth $c^2$, substantially as described.

3. The combination of the frame A, having the rearwardly-extending side arms, the hopper secured between the said arms, the driving-shaft journaled in the hopper, carrying the driving-wheels, and having the stirring-arms, the standards G, attached to the rear ends of the side arms, carrying the shovels I and connected together by the bar $g$, the roller K, journaled between the lower ends of the standards, the handles L, attached to the hopper, the rods H, connecting the bar $g$ with the handles, and the furrow-opener attached to the front end of the frame, substantially as described.

In testimony that I claim the foregoing as my own I have hereto affixed my signature in presence of two witnesses.

DANIEL MURPHY JOHNSON.

Witnesses:
 WALTER L. PARSONS,
 J. T. LITTLE.